United States Patent
Zhong et al.

(10) Patent No.: US 11,789,470 B2
(45) Date of Patent: Oct. 17, 2023

(54) METHOD AND APPARATUS FOR CALIBRATING SLIDING OF SLIDING COMPONENT

(71) Applicant: GUANGDONG OPPO MOBILE TELECOMMUNICATIONS CORP., LTD., Guangdong (CN)

(72) Inventors: Peng Zhong, Guangdong (CN); Jianrong Zheng, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 392 days.

(21) Appl. No.: 17/331,568

(22) Filed: May 26, 2021

(65) Prior Publication Data

US 2021/0286380 A1    Sep. 16, 2021

Related U.S. Application Data

(63) Continuation of application No. PCT/CN2019/105423, filed on Sep. 11, 2019.

(30) Foreign Application Priority Data

Nov. 30, 2018  (CN) .......................... 201811457561.9

(51) Int. Cl.
*H04N 23/57*    (2023.01)
*G05D 3/20*    (2006.01)
*H04M 1/02*    (2006.01)

(52) U.S. Cl.
CPC ............ *G05D 3/20* (2013.01); *H04M 1/0264* (2013.01); *H04N 23/57* (2023.01)

(58) Field of Classification Search
CPC ...... G05D 3/20; H04N 23/57; H04N 5/23219; H04N 5/2252; H04N 5/2257; G05F 1/1624

See application file for complete search history.

(56) References Cited

U.S. PATENT DOCUMENTS 6,812,958 B1 * 11/2004 Silvester ................ H04N 23/51
                                                  348/E5.026
6,876,379 B1 *  4/2005 Fisher .................... H04N 7/142
                                                  348/14.02

(Continued)

FOREIGN PATENT DOCUMENTS

CN    105554196 A    5/2016
CN    106534093 A    3/2017

(Continued)

OTHER PUBLICATIONS

China Notice of Allowance with English Translation for CN Application 201811457561.9 dated Jun. 11, 2020. (8 pages).

(Continued)

*Primary Examiner* — Rina I Duda
(74) *Attorney, Agent, or Firm* — Young Basile Hanlon & MacFarlane, P.C.

(57) ABSTRACT

A method for calibrating a sliding of a sliding component includes: obtaining a first detection signal value sent by the first Hall element and a second detection signal value sent by the second Hall element, corresponding to one or more first calibration positions reached during a sliding process of the sliding component; comparing the first detection signal value corresponding to each of the one or more first calibration positions with a preset first reference signal value, and comparing the second detection signal value corresponding to each of the one or more first calibration positions with a preset second reference signal value; and calibrating the first reference signal value based on the first detection signal value, and calibrating the second reference signal value based on the second detection signal value, in response that a number of times that comparison results belong to a preset abnormal range reaches a preset threshold.

20 Claims, 10 Drawing Sheets

(56) References Cited

U.S. PATENT DOCUMENTS

| | | | | |
|---|---|---|---|---|
| 7,210,629 | B2* | 5/2007 | Cho | H04N 23/55 348/14.02 |
| 7,847,860 | B2* | 12/2010 | Kim | H04M 1/0218 455/575.1 |
| 8,606,327 | B2 | 12/2013 | Irie et al. | |
| 2014/0080542 | A1* | 3/2014 | Pan | H04M 1/0283 455/556.1 |
| 2015/0230570 | A1* | 8/2015 | Kim | H04M 1/185 150/139 |
| 2017/0097689 | A1 | 4/2017 | Miller | |
| 2017/0237884 | A1 | 8/2017 | Evans, V et al. | |

FOREIGN PATENT DOCUMENTS

| | | |
|---|---|---|
| CN | 106856516 A | 6/2017 |
| CN | 107092772 A | 8/2017 |
| CN | 108833623 A | 11/2018 |
| CN | 108848224 A | 11/2018 |
| CN | 108897375 A | 11/2018 |
| CN | 108900663 A | 11/2018 |
| CN | 108900664 A | 11/2018 |
| CN | 108900665 A | 11/2018 |
| CN | 109542174 A | 3/2019 |
| JP | 2005354420 A | 12/2005 |
| JP | 2006325114 A | 11/2006 |
| JP | 2009199301 A | 9/2009 |
| JP | 2013538345 A | 10/2013 |
| JP | 2014226024 A | 12/2014 |
| JP | 2015014479 A | 1/2015 |

OTHER PUBLICATIONS

China First Office Action with English Translation for CN Application 201811457561.9 dated Dec. 31, 2019. (17 pages).

International Search Report with English Translation for International Application PCT/CN2019/105423 dated Nov. 29, 2019. (21 pages).

Extended European Search Report for EP Application 19891640.5 dated Apr. 21, 2022. (11 pages).

Indian Examination Report for IN Application 202117024030 dated Apr. 22, 2022. (7 pages).

Japanese Reasons for Refusal with English Translation for JP Application 2021530972 dated Jul. 1, 2022. (6 pages).

* cited by examiner

METHOD AND APPARATUS FOR CALIBRATING SLIDING OF SLIDING COMPONENT

CROSS-REFERENCE TO RELATED APPLICATION(S)

This application is a continuation of International Application No. PCT/CN2019/105423 filed on Sep. 11, 2019, which claims priority to Chinese Patent Application No. 201811457561.9 filed on Nov. 30, 2018, the entire contents of both of which are incorporated herein by reference.

TECHNICAL FIELD

The disclosure relates to the field of electronic technologies, in particular to a method and an apparatus for calibrating a sliding of a sliding component.

BACKGROUND

With popularization of portable electronic devices such as smart phones, it may become major trends for optimization of aesthetics and functionality of the electronic devices. For example, improvement in a screen-to-body ratio of the electronic device may be one of popular trends.

In the related art, a front panel of the electronic device is provided with a camera module and other components, to provide a user with a front camera service. Therefore, contradiction between a ration of an installation space of the camera module on the front panel and the improvement in the screen-to-body ratio needs to be resolved urgently.

SUMMARY

Embodiments of the disclosure in a first aspect provide a method for calibrating a sliding of a sliding component. The sliding component is configured in an electronic device. The electronic device includes a body, a detecting component and a driving component. The driving component is configured to control the sliding component to slide between a first position received in the body and a second position exposed from the body. The detecting component includes a magnetic field generating element, a first Hall element and a second Hall element. The magnetic field generating element is fixed on the sliding component, the first Hall element and the second Hall element are fixed on the body. When the sliding component slides from the first position to the second position, the magnetic field generating element is far away from the first Hall element and close to the second Hall element. The method includes: obtaining a first detection signal value sent by the first Hall element and a second detection signal value sent by the second Hall element, corresponding to one or more first calibration positions reached during a sliding process of the sliding component; comparing the first detection signal value corresponding to each of the one or more first calibration positions with a preset first reference signal value, and comparing the second detection signal value corresponding to each of the one or more first calibration positions with a preset second reference signal value; and calibrating the first reference signal value based on the first detection signal value, and calibrating the second reference signal value based on the second detection signal value, in response that a number of times that comparison results belong to a preset abnormal range reaches a preset threshold.

Embodiments of the disclosure in a second aspect provide an electronic device. The electronic device includes a body, a sliding component, a detecting component and a driving component. The driving component is configured to control the sliding component to slide between a first position received in the body and a second position exposed from the body. The detecting component includes a magnetic field generating element, a first Hall element and a second Hall element. The magnetic field generating element is fixed on the sliding component, the first Hall element and the second Hall element are fixed on the body. When the sliding component slides from the first position to the second position, the magnetic field generating element is far away from the first Hall element and close to the second Hall element. The electronic device further includes: a memory, a processor electrically coupled to the sliding component, and a computer program stored on the memory and for running on the processor. When the processor executes the computer program, the method for calibrating the sliding of the sliding component according to the above embodiments is performed.

Embodiments of the disclosure in a third aspect provide a computer-readable storage medium with a computer program stored thereon. When the computer program is executed by a processor, the method for calibrating the sliding of the sliding component according to the above embodiments is performed.

Additional aspects and advantages of the disclosure will be given in part in the following descriptions, become apparent in part from the following descriptions, or be learned from the practice of the disclosure.

BRIEF DESCRIPTION OF DRAWINGS

In order to clearly illustrate embodiments of the disclosure or technical solutions in the related art, a brief description of drawings used in embodiments or in the related art descriptions is given below. Obviously, the drawings in the following descriptions are only part embodiments of the disclosure, and for those skilled in the art, other drawings can be obtained according to these drawings without creative labor.

DETAILED DESCRIPTION

Figure 1:
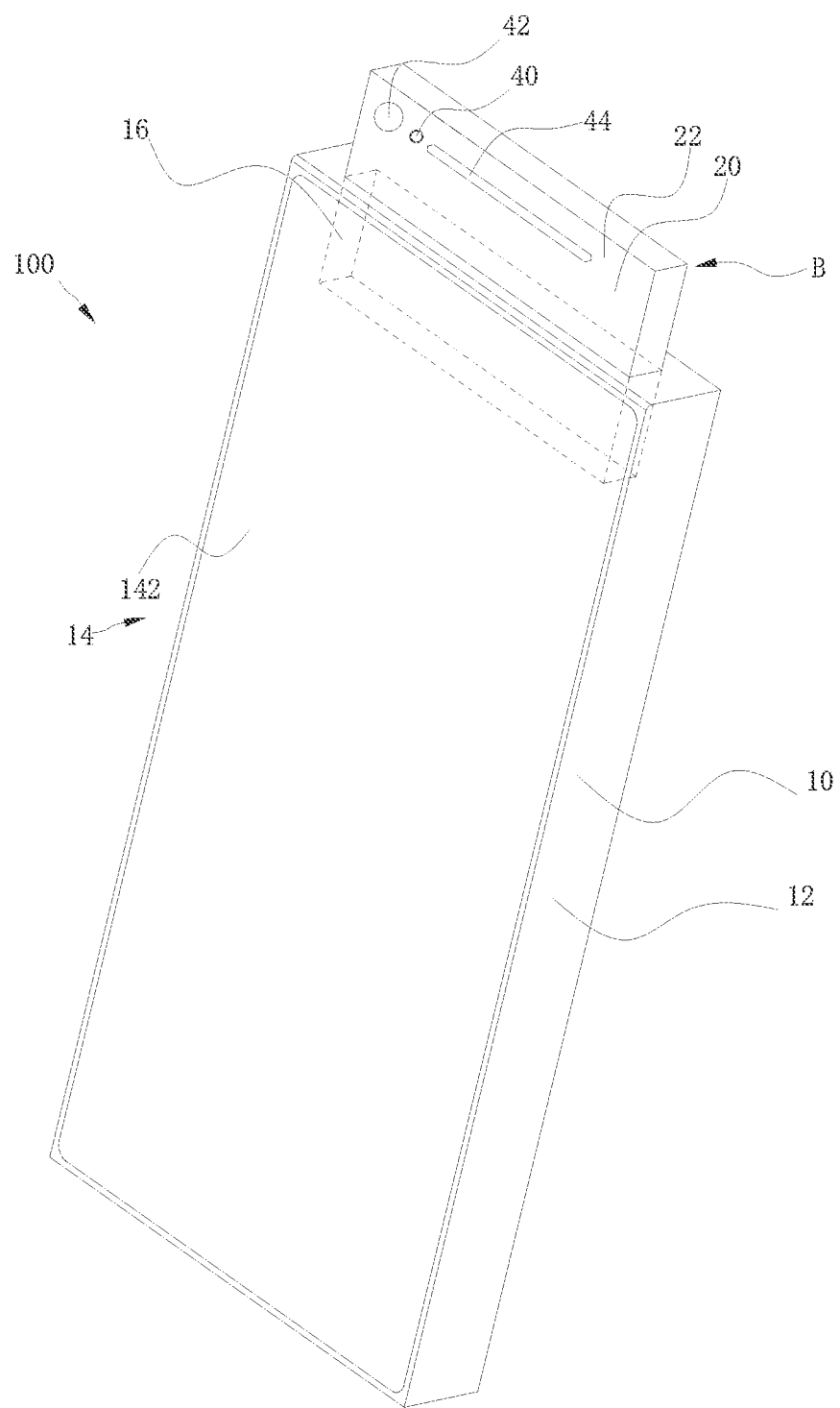
FIG. 1 is a schematic diagram of a state of an electronic device in a second position according to embodiments of the disclosure.
Figure 2:
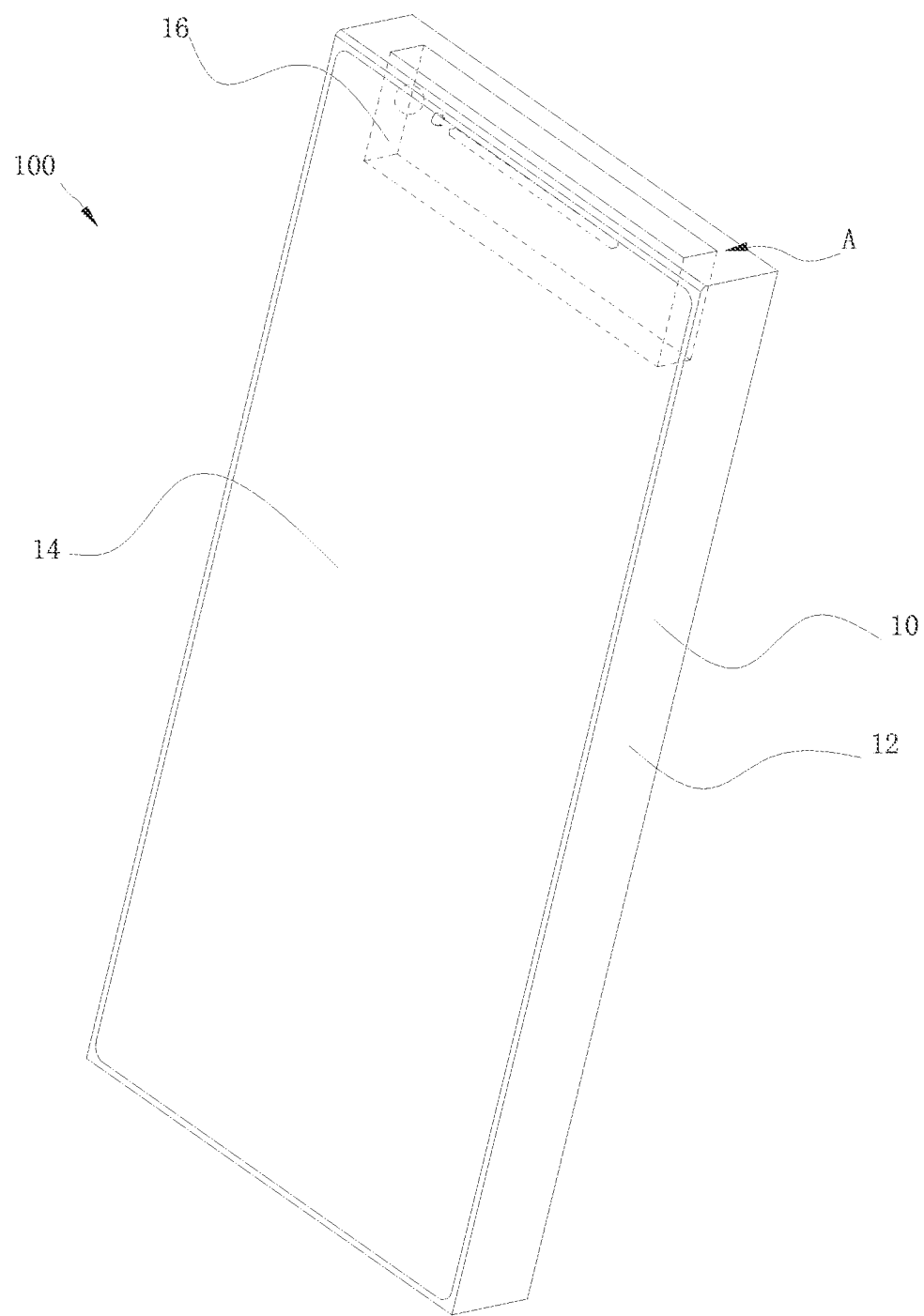
FIG. 2 is a schematic diagram of a state of an electronic device in a first position according to embodiments of the disclosure.
Figure 3:
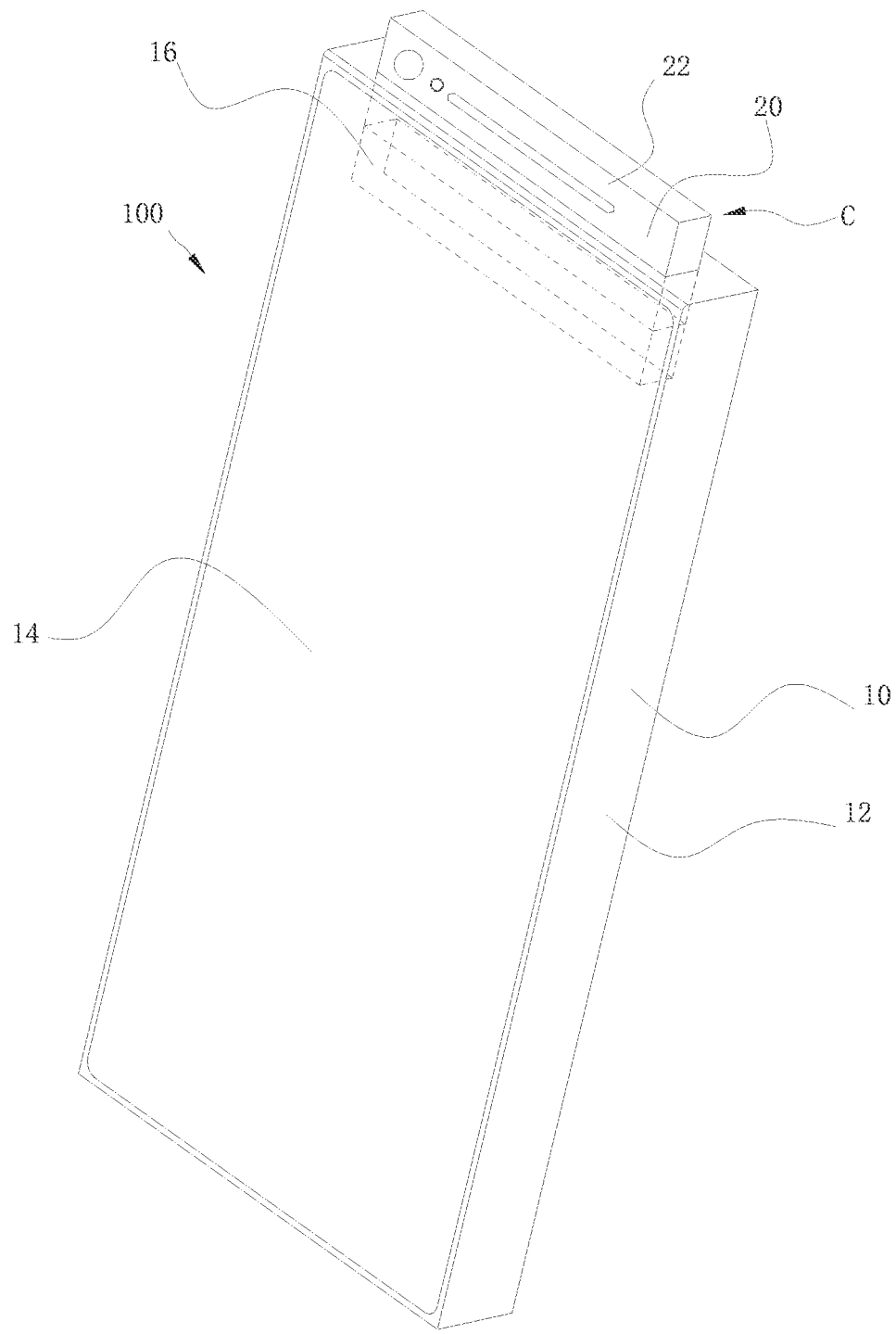
FIG. 3 is a schematic diagram of a state of an electronic device in a third position according to embodiments of the disclosure.
Figure 4:
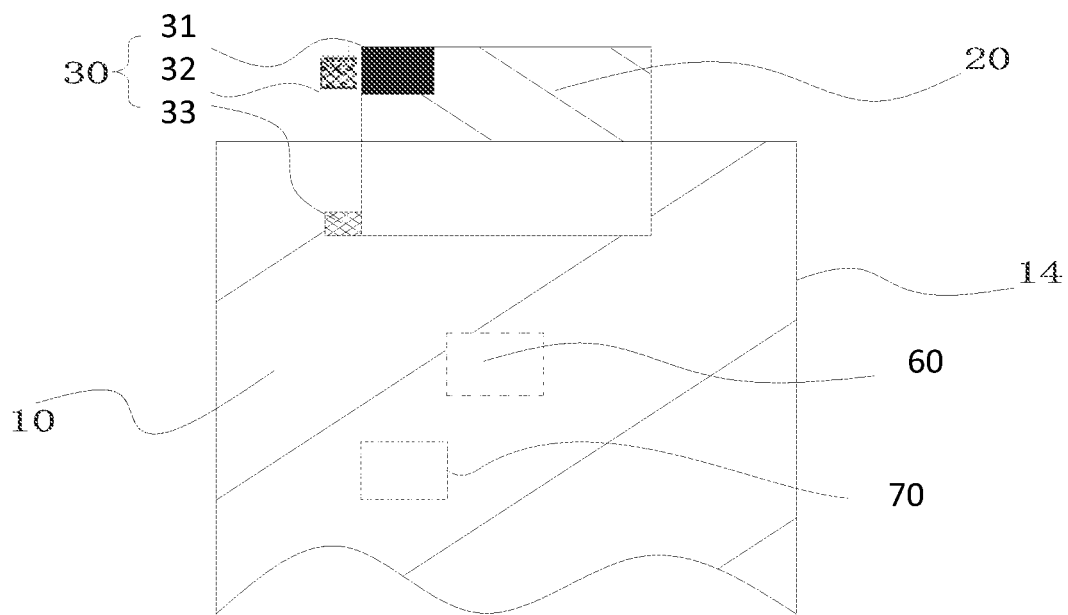
FIG. 4 is a schematic diagram of a detecting component according to embodiments of the disclosure.

Reference will be made in detail to embodiments of the disclosure. Examples of the embodiments are illustrated in accompanying drawings, in which the same or similar elements and the elements having same or similar functions are denoted by like reference numerals throughout the descriptions. The embodiments described herein with reference to drawings are explanatory, illustrative, and used to generally understand the disclosure. The embodiments shall not be construed to limit the disclosure.

In the description of the disclosure, it is to be understood that, terms such as "center", "longitudinal", "lateral", "length", "width", "thickness", "over", "below", "front", "back", "left", "right", "vertical", "horizontal", "top", "bottom", "in", "out", "clockwise", "anti-clockwise" refer to the directions and location relations which are the directions and location relations shown in the drawings, and for describing the disclosure and for describing in simple, and which are not intended to indicate or imply that the device or the elements are disposed to locate at the specific directions or are structured and performed in the specific directions, which could not to be understood to the limitation of the disclosure. In addition, terms such as "first" and "second" are used herein for purposes of description and are not intended to indicate or imply relative importance or significance. Furthermore, the feature defined with "first" and "second" may comprise one or more this feature distinctly or implicitly. In the description of the disclosure, "a plurality of" means two or more than two, unless specified otherwise.

In the disclosure, unless specified or limited otherwise, the terms "mounted," "connected," "coupled" and "fixed" are understood broadly, such as fixed, detachable mountings, connections and couplings or integrated, and can be mechanical or electrical mountings, connections and couplings, and also can be direct and via media indirect mountings, connections, and couplings, and further can be inner mountings, connections and couplings of two components or interaction relations between two components, which can be understood by those skilled in the art according to the detail embodiment of the disclosure.

In the disclosure, unless specified or limited otherwise, the first characteristic is "on" or "under" the second characteristic refers to the first characteristic and the second characteristic can be direct or via media indirect mountings, connections, and couplings. And, the first characteristic is "on", "above", "over" the second characteristic may refer to the first characteristic is right over the second characteristic or is diagonal above the second characteristic, or just refer to the horizontal height of the first characteristic is higher than the horizontal height of the second characteristic. The first characteristic is "below" or "under" the second characteristic may refer to the first characteristic is right over the second characteristic or is diagonal under the second characteristic, or just refer to the horizontal height of the first characteristic is lower than the horizontal height of the second characteristic.

Many different embodiments or examples are provided in the disclosure herein to implement different structures of the disclosure. To simplify the disclosure of the disclosure, the components and settings of specific examples are provided below. Of course, they are merely examples, and are not intended to limit the disclosure. Furthermore, reference numbers and/or letters may be repeated in different examples of the disclosure. Such repetitions are for simplification and clearness, rather than indicating the relations of the discussed embodiments and/or settings. Moreover, the disclosure provides examples of various specific processes and materials, but the applicability of other processes and/or application of other materials may be appreciated by those having ordinary skill in the art.

A method and an apparatus for calibrating a sliding of a sliding component, provided in embodiments of the disclosure, may be described below with reference to the accompanying drawings.

In order to more clearly describe the method and the apparatus for calibrating the sliding of the sliding component provided in embodiments of the disclosure, a structure of an electronic device of the disclosure is described firstly.

In detail, in order to reduce an influence of hardware device(s) installed on a front panel of the electronic device such as a front camera on the screen-to-body ratio, the disclosure provides a sliding component. The front camera may slide out as needed and may be received in a body of the electronic device as not needed through a controlling of sliding of the sliding component. As a result, when functional services of components such as the front camera are not performed, the front panel of the electronic device is not occupied.

In detail, as illustrated in FIGS. 1 to 4, and 8, an electronic device 100 according to embodiments of the disclosure may include a body 10, a sliding component 20, a detecting component 30 and a driving component 50. The sliding component 20 is configured to slide between a first position A received in the body 10 and a second position B exposed from the body 10. The driving component 50 is configured to drive the sliding component 20 to slide between the first position received in the body 10 and the second position exposed from the body.

Certainly, in order to make the driving component 50 know that the sliding component 20 slides to the corresponding position, the electronic device may also include the detecting component 30 for detecting the current position of the sliding component 20. In the embodiments of the disclosure, the detecting component 30 is configured to detect the position of the sliding component 20. The detecting component 30 includes a magnetic field generating element 31, a first Hall element 32 and a second Hall element 33. The magnetic field generating element 31 is fixed on the sliding component 20, the first Hall element 32 and the second Hall element 33 are fixed on the body 10, in which the electronic device may further include a processor 60 electrically coupled to the detecting component 30 for receiving detection signal values output by the first Hall element 32 and the second Hall element 33 and for determining a current relative position of the sliding component 20 relative to the body 10 based on the detection signal values.

Figure 5:
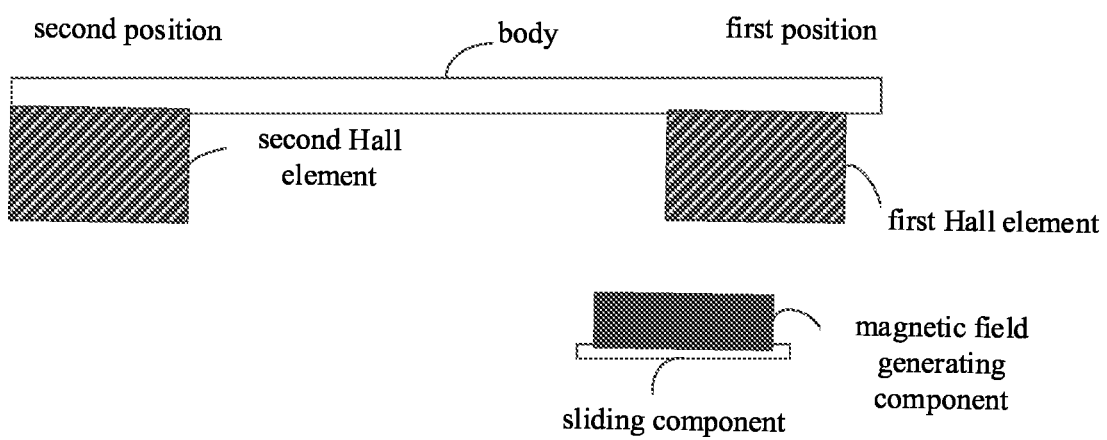
FIG. 5 is a diagram of a usage scene of an electronic device according to embodiments of the disclosure.

It should be noted that, in the embodiments of the disclosure, when the sliding component 20 slides from the first position to the second position, as illustrated in FIG. 5, the magnetic field generating element 31 is far away from the first Hall element 32 and close to the second Hall element 33. In addition, the magnetic field generating element 31 and the Hall elements may be placed opposite to each other in the vertical direction, or may be placed opposite to each other in the horizontal direction. In other words, as long as the magnetic field generating element 31 and the Hall elements generate relative motion, there is no restriction on the specific positions of the magnetic field generating element and the Hall elements.

In some embodiments, the body 10 is formed with a sliding groove 16, and the sliding component 20 is received in the sliding groove 16 when at the first position A. In this way, the sliding component 20 is made to slide between the first position A and the second position B through the sliding groove 16.

In detail, the body 10 includes a housing 12 and a displaying component 14, and the housing 12 and the displaying component 14 are combined to form a closed structure. The sliding groove 16 is opened on the housing 12 so as to realize sliding-in and sliding-out of the sliding component 20. It is understood that the sliding groove 16 is opened on any side of the housing 12. Preferably, the sliding groove 16 is opened on the top edge of the housing 12, which conforms to the users' usage habits.

The displaying component 14 includes a touch panel (not illustrated) and a cover plate 142. The touch panel includes a displaying module (not illustrated) and a touch layer (not illustrated) provided on the displaying module. The displaying module is, for example, a liquid crystal display (LCD) Module (LCM). Certainly, the displaying module may be a flexible displaying module. The touch layer is configured to receive an input through touch from the user to generate a signal for controlling the content displayed in the displaying module and a signal for controlling the sliding of the sliding component 20.

The material of the cover plate 142 may be made of transparent materials such as glass, ceramics or sapphire. Since the cover plate 142 is configured as an input part of the electronic device 100, the cover plate 142 is often contacted by collisions or scratches. For example, when the user puts the electronic device 100 in the pocket, the cover plate 142 may be scratched and damaged by keys in the user's pocket. Therefore, the material of the cover plate 142 may be a material with a relatively high hardness, such as sapphire. Or, a hardened layer is formed on the surface of the cover plate 142 to improve a scratch resistance of the cover plate 142.

The touch panel and the cover plate 142 are bonded and fixed together, for example, by Optically Clear Adhesive (OCA). The OCA not only adheres and fixes the touch panel and the cover plate 142, but also may emit light from the touch panel.

Figure 6:
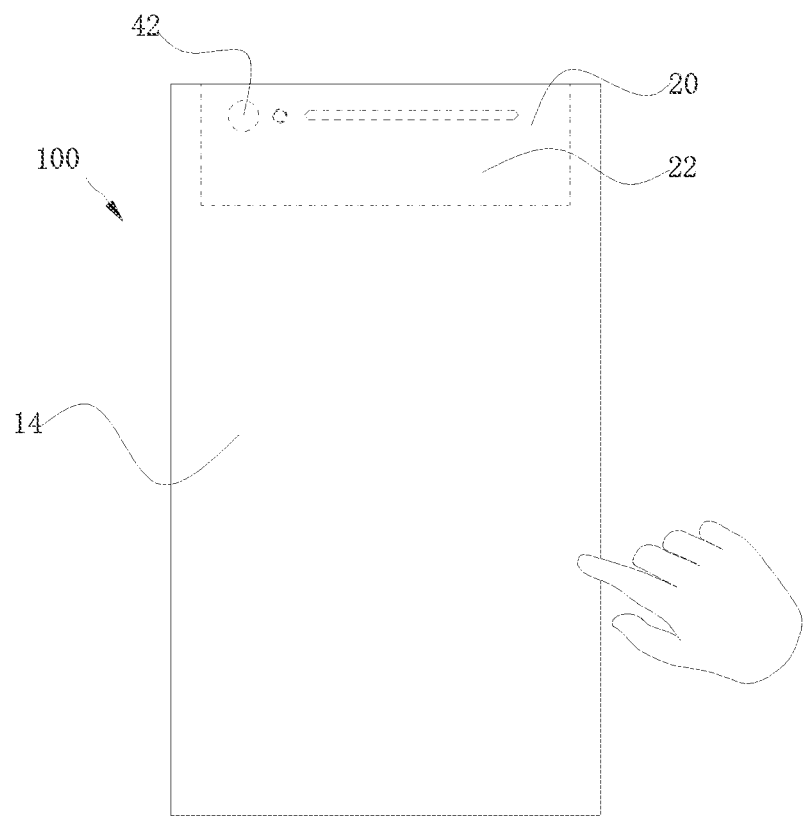
FIG. 6 is a diagram of a usage scene of an electronic device according to embodiments of the disclosure.

In order to more clearly illustrate the function of the sliding component 20 in the embodiments of the disclosure, referring to FIG. 6, in some embodiments, the electronic device 100 includes a front camera 42, the sliding component 20 includes a carrier 22, and the front camera 42 is provided on the carrier 22. In this way, the front camera 42 slides along with the sliding component 20. Certainly, the user turns on the front camera 42 and turns off the front camera 42 as trigger signals, that is, when the user turns on the front camera 42, the sliding component 20 is triggered to slide out, and when the user turns off the front camera 42, the sliding component 20 is triggered to slide back. In this way, the user only needs to turn on or off the front camera according to the existing habits, and does not need to perform additional operations on the sliding component 20, which is convenient for the user to use.

In addition to the front camera 42, other functional devices 40 may also be carried on the carrier 22, such as a light sensor, a proximity sensor and an earpiece 44, as illustrated in FIG. 1. These functional devices 40 may be exposed from the body 10 as the sliding component 20 slides out according to the input of the user, to work normally, or may be received in the body 10 as the sliding component 20 slides back according to the input of the user. In this way, the displaying component 14 is provided with as few through holes as possible, which is beneficial to satisfy the design requirements of the full screen of the electronic device 100.

In detail, when the light sensor is carried on the carrier 22, the light sensor is arranged on the top of the carrier 22, that is, when the sliding component 20 is completely received in the sliding groove 16, the light sensor is still exposed from the top of the carrier 22, so as to sense light in real time.

Figure 7:
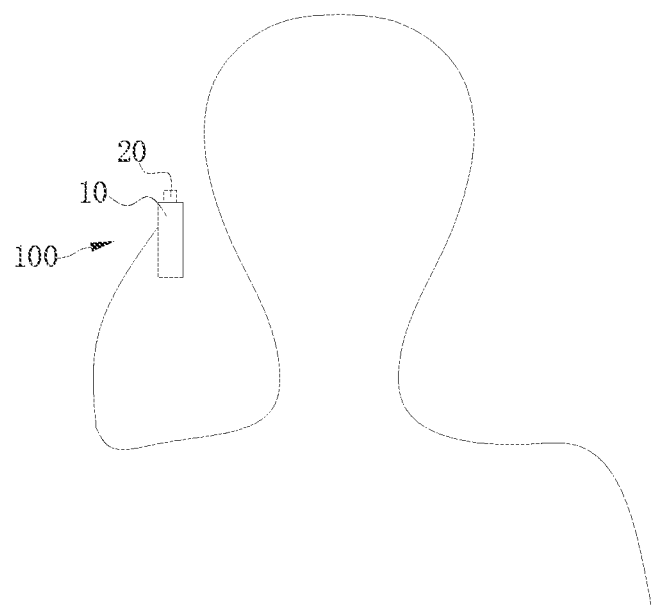
FIG. 7 is a diagram of another usage scene of an electronic device according to embodiments of the disclosure.

As illustrated in FIG. 7, when the carrier 22 carries the proximity sensor and the earpiece 44, the user may answer and hang up the call as trigger signals, that is, when the user answers the call, the sliding component 20 is triggered to slide out. When the user hangs up the phone, the sliding component 20 is triggered to slide back. In this way, the user only needs to answer or hang up the call according to the existing habits, and does not need to perform additional operations on the sliding component 20, which is convenient for the user to use.

It is understood that the plurality of functional devices 40 are carried on the same carrier 22 or on the plurality of carriers. When the plurality of functional devices 40 are carried on the same carrier 22, the plurality of functional devices 40 are arranged longitudinally, and the processor 60 controls the functional device 40 arranged at the lower part of the carrier 22 to expose by controlling a sliding distance of the sliding component 20. When the plurality of functional devices 40 are carried on the plurality of carrier 22, the processor 60 selects the functional device 40 to be exposed by controlling the sliding of a certain carrier 22.

Figure 8:
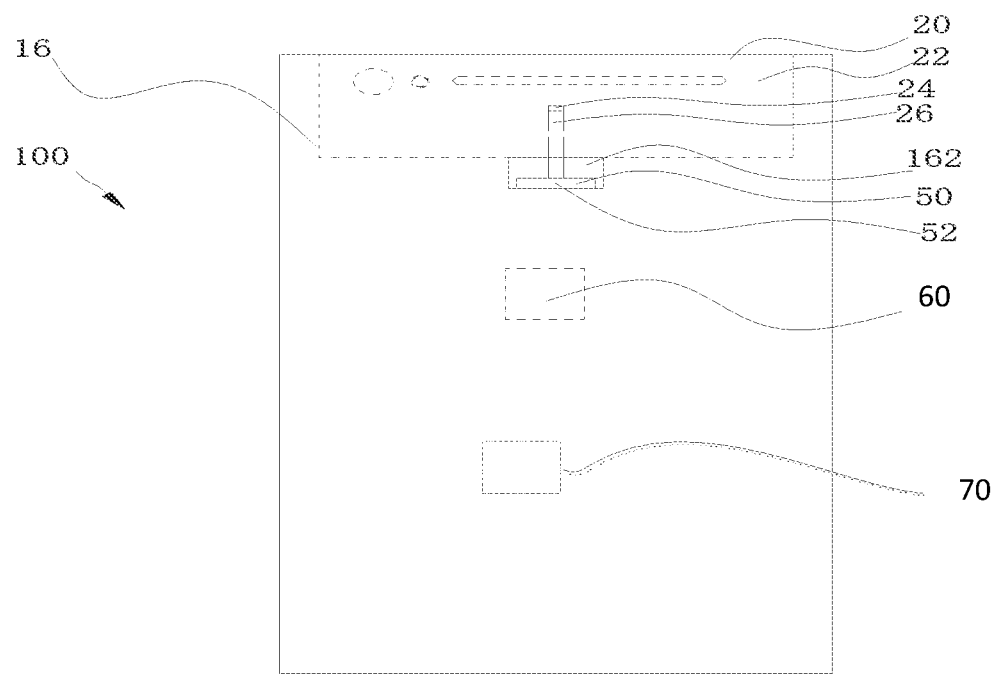
FIG. 8 is a schematic diagram of an electronic device according to embodiments of the disclosure.

As illustrated in FIG. 8, in some embodiments, the sliding component 20 includes a threaded hole 24 provided on the middle of the carrier 22 and a rotating screw 26 that cooperates with the threaded hole 24. The sliding groove 16 includes a groove 162 disposed opposite to the threaded hole 24 and located at the bottom of the sliding groove 16. The electronic device 100 includes a driving component 50 disposed in the groove 162. The driving component 50 includes a driving motor 52 coupled to the processor 60 and an output shaft (not illustrated) coupled to the bottom of the rotating screw 26.

It is understood that the processor 60 controls the sliding of the sliding component 20 by controlling the driving motor 52. When the user commands the sliding component 20 to slide from the first position A to the second position B, the processor 60 controls the driving motor 52 to rotate forward, so that the output shaft drives the rotating screw 26 to rotate in the threaded hole 24, thereby causing the sliding component 20 to slide from the first position A to the second position B. When the user commands the sliding component 20 to slide from the second position B to the first position A, the processor 60 controls the driving motor 52 to reverse, so that the output shaft drives the rotating screw 26 to rotate in the threaded hole 24, thereby causing the sliding component 20 to slide from the second position B to the first position A. It is noted that "from the first position A to the second position B" and "from the second position B to the first position A" herein refer to the sliding direction, rather than the starting and ending points of sliding.

The electronic device 100 of the embodiments of the disclosure employs the Hall elements and the magnetic field generating element 31 to determine the current relative position of the sliding component 20. When the functional devices 40 such as the front camera are carried on the sliding component 20, the state of the sliding component 20 is detected in real time, thereby determining the position of the functional devices 40.

It is understood that the functional devices 40 such as the front camera 42 need to be exposed from the body 10, otherwise the functional devices 40 may not work normally. The electronic device 100 of the embodiments of the disclosure carries the functional devices 40 on the sliding component, so that the functional devices 40 may be received in the body 10 when they do not need to work, and may be exposed from the body 10 along with the sliding component 20 when they need to work. In this way, there is no need to open a through hole on the displaying component 14 for exposing the functional devices 40 such as the front camera 42, thereby increasing the screen-to-body ratio and improving the user experience.

In the related art, the current position of the current sliding component 20 is obtained by the magnetic field signal strength between the magnetic field generating element 31 and the Hall element. For example, the correspondence between magnetic field signal strengths and sliding-out positions of the sliding component 20 is calibrated according to a large amount of test data in advance, so as to match the corresponding sliding-out position based on the current detected magnetic field signal strength.

In order to solve the technical problem of inaccurate speed control due to external electromagnetic interference, as illustrated in FIGS. 1 and 5, the disclosure sets two Hall elements in the electronic device. As the sliding component 20 moves, the magnetic field generating element is far away from the first Hall element and close to the second Hall element. During operation, the current position of the sliding component is detected based on whether the electromagnetic detection signals output by the two Hall elements are consistent with the calibration signals. Therefore, the accuracy of the pre-calibrated detection signal values is particularly important, and the pre-calibrated detection signal values need to be calibrated more reliably.

The method for calibrating the sliding of the sliding assembly is described in detail below.

Figure 9:
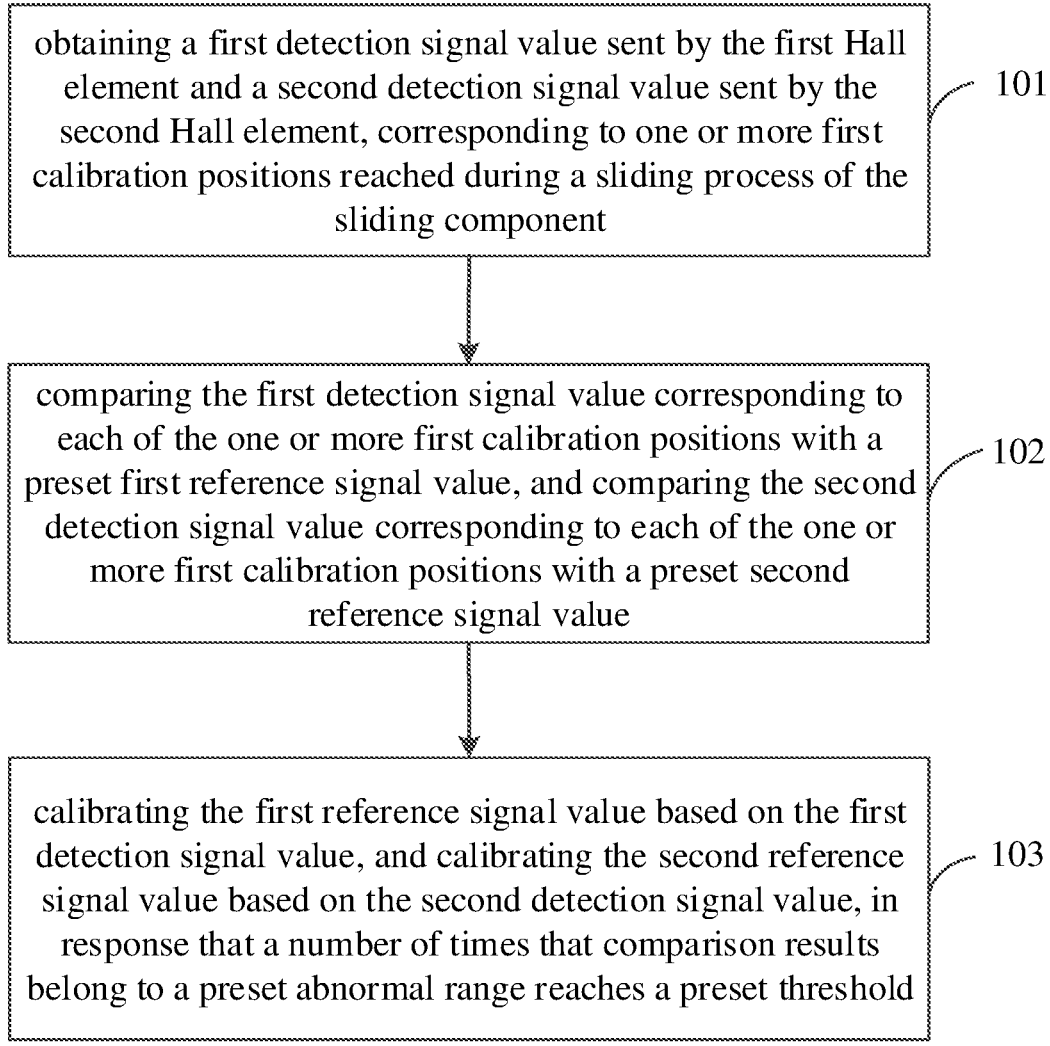
FIG. 9 is a flowchart of a method for calibrating a sliding of a sliding component according to embodiments of the disclosure.

FIG. 9 is a flowchart of a method for calibrating a sliding of a sliding component according to embodiments of the disclosure. As illustrated in FIG. 9, the method includes the following.

At block 101, a first detection signal value sent by the first Hall element and a second detection signal value sent by the second Hall element, corresponding to one or more first calibration positions reached during a sliding process of the sliding component, are obtained.

The first calibration position may be any position of the sliding component. The user may calibrate the positions as needed, or the calibrated positions may be set by default by the system.

In embodiments of the disclosure, according to the operating mechanism of the sliding component, after the driving component controls the sliding component to start at the starting speed, the speed may be switched to the limit speed after a certain position. Therefore, not only smooth starting of the driving component is ensured, but the duration for the sliding component to reach the target position is shortened. In order to protect the sliding component and other devices and reduce the work loss, braking and deceleration control on the sliding component before sliding to the second position or the first position may be performed based on the relevant detection signal values. Therefore, when the sliding component slides in or out, there is a limit speed switching position and a deceleration position. In addition, in actual implementation, some users may manually control the operation of the sliding component, for example, manually pulling out the sliding component or manually pushing the sliding component in. In this case, in order to avoid hardware loss of the sliding component by manual operation, in the embodiments of the disclosure, the sliding-in and sliding-out interruption positions are set, that is, when it is detected that the user manually operates the sliding component, and when the sliding-in interruption position or the sliding-out interruption position is reached, the control operation of the sliding component is converted to conform to the user's manual operation direction. Therefore, if the reference signal value calibrated by the Hall element at the above position is reliable, it is of great significance to the smooth operation of the sliding component. Therefore, in the embodiments of the disclosure, the first calibration positions may include one or more of a sliding-out deceleration position, a sliding-out accelerating position, a sliding-out interruption position, a sliding-in deceleration position, a sliding-in accelerating position and a sliding-in interruption position, of the sliding component.

Figure 10:
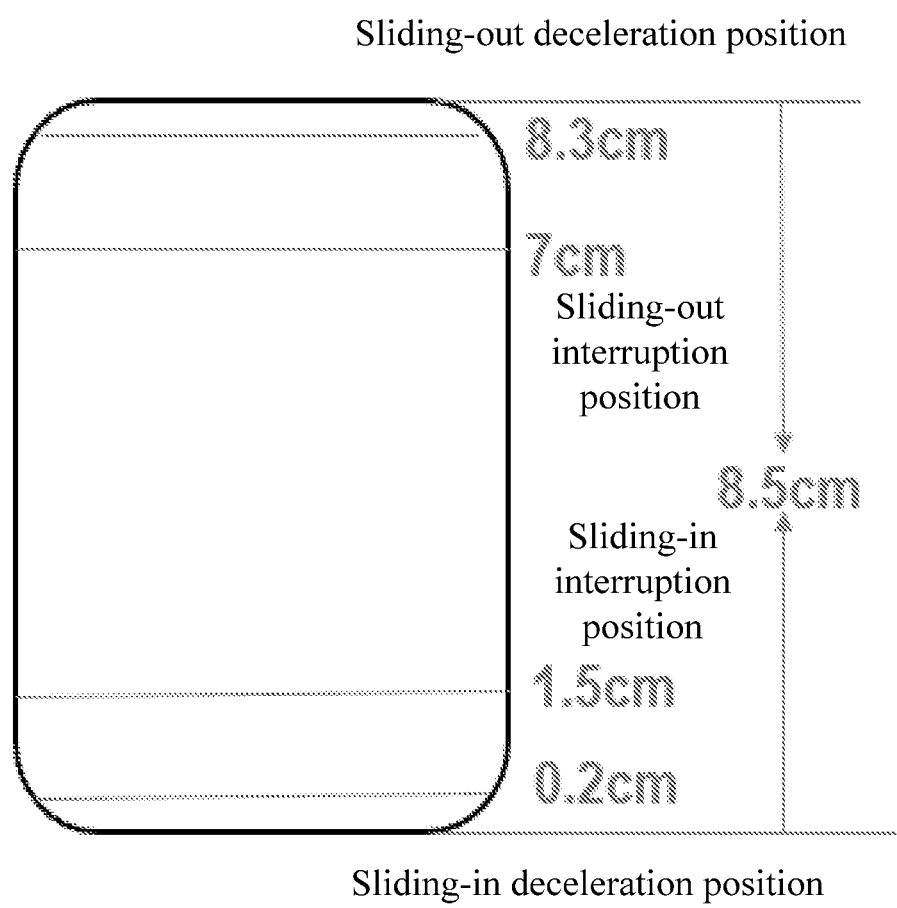
FIG. 10 is a schematic diagram of a first calibration position of a sliding component according to embodiments of the disclosure.

For example, in the example in FIG. 10, the sliding-out interruption position is at 7 cm, and the sliding-out deceleration position is at 8.3 cm when sliding out, and the sliding-in interruption position is at 1.5 cm, and the sliding-in deceleration position is at 0.2 cm when sliding in.

In detail, it may be detected through the distance sensor whether the current sliding component slides to the first calibration position during the sliding process. When the current sliding component slides to the first position, the first detection signal value sent by the first Hall element and the second detection signal value sent by the second Hall element are obtained.

At block 102, the first detection signal value corresponding to each of the one or more first calibration positions is compared with a preset first reference signal value, and the second detection signal value corresponding to each of the one or more first calibration positions is compared with a preset second reference signal value.

It should be noted that, as illustrated in FIG. 5, it is clearly seen that when the sliding component slides from the first position to the second position, the magnetic field generating element is far away from the first Hall element and is close to the second Hall element. The first detection signal value detected by the first Hall element gradually decreases, while the second detection signal value detected by the second Hall element gradually increases. As the sliding component slides from the second position to the first position, the magnetic field generating element is far away from the second Hall element and is close to the first Hall element. Therefore, the second detection signal value detected by the second Hall element gradually decreases, while the first detection signal value detected by the first Hall element gradually increases. Therefore, there is a correspondence between detection signal values and sliding positions of the sliding component. In the actual implementation process, it is a common method to determine the sliding positions according to the detection signal values of the Hall elements. Therefore, it is particularly important to be able to accurately calibrate the signal values of the corresponding positions.

In detail, during the sliding process of the sliding component, the first detection signal values sent by the first Hall element and the second detection signal values sent by the second Hall element, corresponding to the reached one or more calibration positions are obtained, to determine the actual detected signal values of the sliding component sliding to the corresponding positions in the current environment.

At block 103, the first reference signal value is calibrated based on the first detection signal value, and the second reference signal value is calibrated based on the second detection signal value, in response that a number of times that comparison results belong to a preset abnormal range reaches a preset threshold.

In detail, the first detection signal value of each of the first calibration positions is compared with the preset first reference signal value, and the second detection signal value of each of the first calibration positions is compared with the preset second reference signal value, to detect whether the pre-calibrated first reference signal value and the pre-calibrated second reference signal value are accurate. If it is known that the number of times the comparison results belong to the preset abnormal range reaches the preset threshold, for example, the sum of the number of times that the difference between the first reference signal value and the first detection signal value is greater than the preset value, and the number of times that the difference between the second reference signal value and the second detection signal value is greater than the preset value, is greater than the preset threshold, for example, more than 5 times, it is determined that the reference signal values calibrated at the corresponding first calibration position is not accurate. Therefore, the reference signal values at the corresponding position need to be calibrated.

In detail, the first reference signal value is calibrated based on the first detection signal value, and the second reference signal value is calibrated based on the second detection signal value. When the difference of the first detection signal values detected for several times is less than the preset threshold, the first detection signal value obtained by any one measurement is selected as the first reference signal value corresponding to the first calibration position. When the difference of the second detection signal values detected for several times is less than the preset threshold, the second detection signal value obtained by any one measurement is selected as the second reference signal value corresponding to the first calibration position. When the first detection signal values detected for several times are not equal to one another, and there are first detection signal values whose difference between each other is greater than the preset threshold (the preset threshold is small), the average value of the first detection signal values detected for several times is determined as the new first reference signal value. When the second detection signal values detected for several times are not equal to one another, and there are second detection signal values whose differences between each other is greater than the preset threshold (the preset threshold is small), the average value of the second detection signal values detected for several times is determined as the new second reference signal value.

Certainly, in the actual execution process, due to the sliding failure of the sliding component, the sliding component may not slide in place, which may cause that the detection signal values of the Hall elements at some second calibration positions in the first calibration positions could not be collected. Therefore, it is necessary to control the sliding component to slide to the corresponding second calibration position, and it may calibrate for the detection signal values of the second calibration position. It should be noted that when the detection signal values at the second calibration position are collected, because it may not be reached, the detection signal values at the second calibration position may not be collected. At this time, it is obvious that the comparison result between the detection signal value at the second calibration position and the pre-calibrated reference signal value belongs to the abnormal range.

In detail, the sliding component is controlled to slide to one or more preset second calibration positions that have not been reached before, and the third detection signal value sent by the first Hall element, corresponding to each second calibration position, is obtained, and the fourth detection signal value sent by the second Hall element, corresponding to each second calibration position, is obtained. The third reference signal value of the second calibration position is calibrated based on the third detection signal value, and the fourth reference signal value of the second calibration position is calibrated based on the fourth detection signal value. The method for calibrating the reference signal values at the second calibration position refers to the method for calibrating the reference signal values at the first calibration position, which is not repeated herein.

The method for determining the second calibration positions varies with different scenarios. As a possible implementation, third calibration positions corresponding to first detection signal values and second detection signal values may be counted, and the third calibration positions may be matched with the first calibration positions, and the second calibration positions that do not match the third calibration positions in the first calibration positions may be determined. That is, when it is found that the calibration position corresponding to the detection signal value does not cover the first calibration positions, it is determined to be the second calibration position. There is a situation in which the detection signal value of the calibration position A is detected in a cycle, but the calibration position A is not detected in another cycle. At this time, the position A is determined to be the second calibration position.

In embodiments, in order to eliminate the obstacle that the sliding component may not reach the second calibration position, it is also possible to send a calibration notification by means of a pop-up window before calibrating the reference signal values of the second calibration position. The calibration notification is prior to other operations. After a confirmed calibration instruction sent from the user according to the calibration command is received, for example, after receiving the user's trigger operation on the confirmation control in the pop-up window, the driving component is controlled to drive the sliding component to slide between the first position and the second position with the highest driving force of the driving component. When the sliding component slides to the second calibration position, the third detection signal value and the fourth detection signal value are detected by the first Hall element and the second Hall element.

When the sliding component may not reach the second calibration position because there is a foreign object in the sliding track of the sliding component, the user manually removes the obstacle and sends a confirmed calibration instruction, or the electronic device detects causes of the obstacle according to the relevant sensor, and displays the causes of the obstacle in the calibration notification, the user may send the confirmed calibration instruction after the obstacle is determined to be eliminated.

As analyzed above, when the first calibration position is one or more of a sliding-out deceleration position, a sliding-out accelerating position, a sliding-out interruption position, a sliding-in deceleration position, a sliding-in accelerating position and a sliding-in interruption position, of the sliding component, the displaying of the sliding speed of the sliding component is different. When the sliding speed of the sliding component is different, the difference in the sliding speed causes the signal generated by the magnetic field generating element to be interfered to different degree. Therefore, in the embodiments of the disclosure, in order to improve the accuracy of the calibration, when sliding from the first position to the second position, the reference signal values of the sliding component's sliding-out deceleration position, sliding-out acceleration position, and sliding-out interruption position are calibrated. When sliding from the second position to the first position, the reference signal values of the sliding component's sliding-in deceleration position, sliding-in acceleration position, and sliding-in interruption position are calibrated. On the basis, the same calibration method is applied to the first calibration position that does not belong to the second calibration position to ensure the accuracy of the calibrated reference signal values, that is, the reference signal values detected during the detection process may not be used for calibration. In order to prevent the sliding speed from being affected due to the sliding failure of the sliding component during the detection process, the detection signal value and the detection signal value in the normal working state are greatly different.

In order to make the method for calibrating the sliding of the sliding component of the embodiments of the disclosure clearer to those skilled in the art, the following description is given in combination with specific examples. In this example, four first calibration positions are illustrated in FIG. 10, and the preset threshold corresponding to the number of times is N, in which N is a positive integer.

Figure 11:
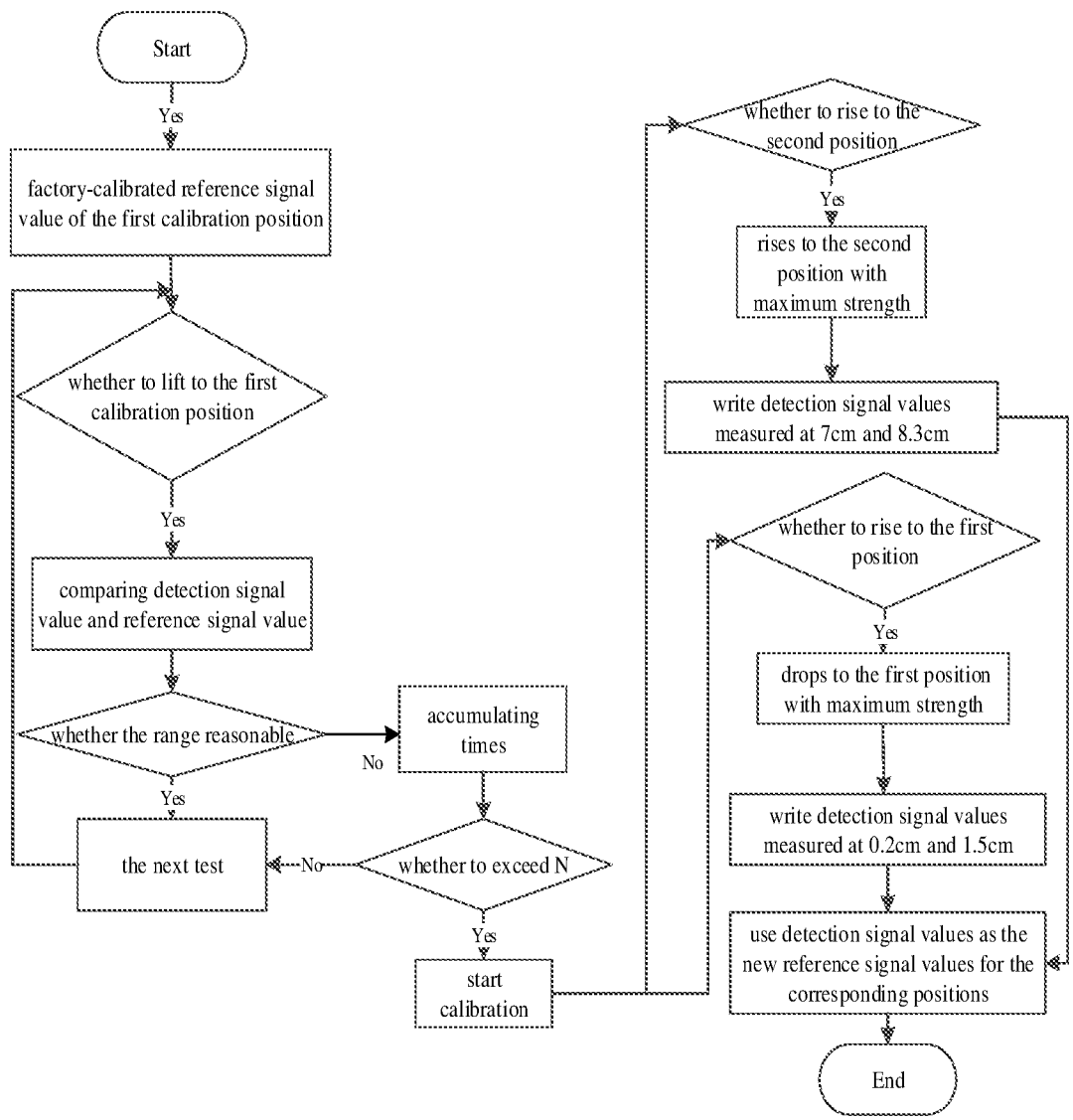
FIG. 11 is a flowchart of a method for calibrating a sliding of a sliding component according to embodiments of the disclosure.

In detail, as illustrated in FIG. 11, when the electronic device leaves the factory, the reference signal value of the first calibration position may be set. The reference signal value is calibrated. It is detected whether the difference range between the acquired detection signal value and the reference signal value of the first calibration position is reasonable. If it is unreasonable, the number of times is accumulated. If the difference range is reasonable, and the number of times accumulated is less than N, loop detection is performed until it is found that the number of times accumulated is not less than N.

The reference signal value is calibrated, and the sliding component is controlled to slide to the first position or the second position. If the sliding component slides to the first position or the second position, the detection signal values at 7 cm and 8.3 cm may be recorded when sliding from first position to the second position, and the reference signal values at 7 cm and 8 cm may be calibrated based on the detection signal values. When the sliding component slides from the second position to the first position, the detection signal values at 1.5 cm and 0.2 cm may be recorded, and the reference signal values at 1.5 cm and 0.2 may be calibrated based on the detection signal values. As a result, the reference signal values are rewritten.

In conclusion, according to the method for calibrating the sliding of the sliding component provided in the embodiments of the disclosure, the influence of related components on the screen-to-body ratio may be reduced through the sliding component, and the reference signal values of the relevant positions in the sliding component may be calibrated. The reference signal values may be calibrated based on the detection signal values detected by the two Hall elements, which may improve the reliability of detecting sliding positions of the sliding component.

Figure 12:
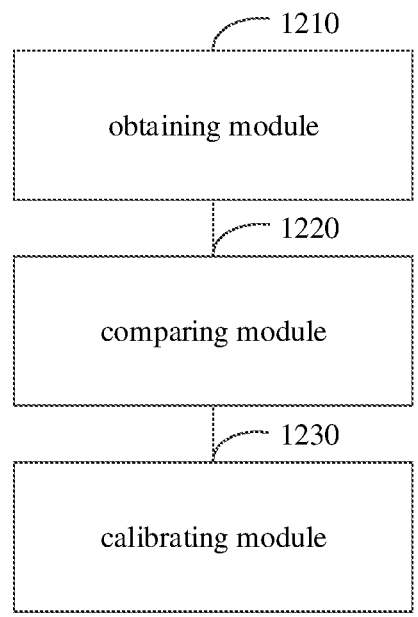
FIG. 12 is a block diagram of an apparatus for calibrating a sliding of a sliding component according to embodiments of the disclosure.

In order to realize the above embodiments, the disclosure further provides an apparatus for calibrating a sliding of a sliding component. FIG. 12 is a block diagram of an apparatus for calibrating a sliding of a sliding component according to embodiments of the disclosure. The sliding component is configured in an electronic device. The electronic device includes a body, a detecting component and a driving component. The driving component is configured to control the sliding component to slide between a first position received in the body and a second position exposed from the body. The detecting component includes a magnetic field generating element, a first Hall element and a second Hall element. The magnetic field generating element is fixed on the sliding component, the first Hall element and the second Hall element are fixed on the body. When the sliding component slides from the first position to the second position, the magnetic field generating element is far away from the first Hall element and close to the second Hall element. As illustrated in FIG. 12, the apparatus includes: an obtaining module 1210, a comparing module 1220 and a calibrating module 1230.

The obtaining module 1210 is configured to obtain a first detection signal value sent by the first Hall element and a second detection signal value sent by the second Hall element, corresponding to one or more first calibration positions reached during a sliding process of the sliding component.

In embodiment, the one or more first calibration positions may include one or more of a sliding-out deceleration position, a sliding-out accelerating position, a sliding-out interruption position, a sliding-in deceleration position, a sliding-in accelerating position, and a sliding-in interruption position, of the sliding component.

The comparing module 1220 is configured to compare the first detection signal value corresponding to each of the one or more first calibration positions with a preset first reference signal value, and compare the second detection signal value corresponding to each of the one or more first calibration positions with a preset second reference signal value.

The calibrating module 1230 is configured to calibrate the first reference signal value based on the first detection signal value, and calibrate the second reference signal value based on the second detection signal value, in response that a number of times that comparison results belong to a preset abnormal range reaches a preset threshold.

Figure 13:
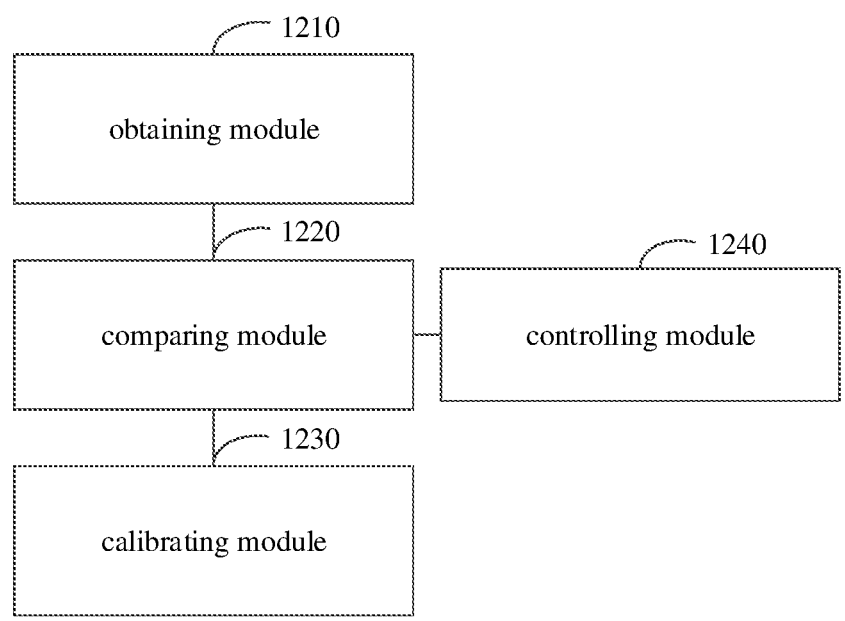
FIG. 13 is a block diagram of another apparatus for calibrating a sliding of a sliding component according to embodiments of the disclosure.

In embodiments, as illustrated in FIG. 13, on the basis of FIG. 12, the apparatus further includes a controlling module 1240. The controlling module 1240 is configured to control the sliding component to slide to one or more preset second calibration positions that have not been reached before.

In embodiments, the obtaining module 1210 is further configured to obtain a third detection signal value sent by the first Hall element corresponding to each of the one or more second calibration positions and a fourth detection signal value sent by the second Hall element corresponding to each of the one or more second calibration positions.

The calibrating module 1230 is further configured to calibrate a third reference signal value of the second calibration position based on the third detection signal value, and calibrate a fourth reference signal value of the second calibration position based on the fourth detection signal value.

It should be noted that the explanation of the embodiments of the method for calibrating the sliding of the sliding component is also applicable to the apparatus for calibrating the sliding of the sliding component of the embodiments of the disclosure, and the implementation principle is similar, which is not repeated herein.

In conclusion, for the apparatus for calibrating the sliding of the sliding component provided in the embodiments of the disclosure, the influence of related components on the screen-to-body ratio may be reduced through the sliding component, and the reference signal values of the relevant positions in the sliding component may be calibrated. The reference signal values may be calibrated based on the detection signal values detected by the two Hall elements, which may improve the reliability of detecting sliding positions of the sliding component.

In order to realize the above embodiments, the disclosure provides an electronic device. With reference to FIGS. 1 to 4, the electronic device includes a body 10, a detecting component 30 and a driving component 50. The driving component 50 is configured to control the sliding component to slide between the first position received in the body and the second position exposed from the body. The detecting component includes a magnetic field generating element 31, a first Hall element 32 and a second Hall element 33. The magnetic field generating element 31, the first Hall element 32 and the second Hall element 33 are respectively fixed on the sliding component 20 and the body 10. When the sliding component 20 slides from the first position to the second position, the magnetic field generating element 31 is far away from the first Hall element 32 and is close to the second Hall element 33. The electronic device further includes: a memory 70, a processor electrically coupled to the sliding component, and a computer program stored on the memory 70 and for running on the processor 60. When the processor executes the program, the method for calibrating the sliding of the sliding component according to the above embodiments is performed.

In order to implement the above embodiments, the embodiments of the disclosure provide a computer-readable storage medium on which a computer program is stored. When the program is executed by a processor, the method for calibrating the sliding of the sliding component as described in the above method embodiments is performed.

Reference throughout this specification to "an embodiment," "some embodiments," "an example," "a specific example," or "some examples," means that a particular feature, structure, material, or characteristic described in connection with the embodiment or example is included in at least one embodiment or example of the disclosure. The appearances of the above phrases in various places throughout this specification are not necessarily referring to the same embodiment or example of the disclosure. Furthermore, the particular features, structures, materials, or characteristics may be combined in any suitable manner in one or more embodiments or examples.

Although the embodiments of the disclosure have been shown and described, those of ordinary skill in the art can understand that various changes, modifications, substitutions and modifications are made to these embodiments without departing from the principle and purpose of the disclosure. The scope of the disclosure is defined by the claims and the equivalents.

What is claimed is:

1. A method for calibrating a sliding of a sliding component, wherein the sliding component is configured in an electronic device; the electronic device comprises a body, a detecting component and a driving component; the driving component is configured to control the sliding component to slide between a first position received in the body and a second position exposed from the body; the detecting component comprises a magnetic field generating element, a first Hall element and a second Hall element; the magnetic field generating element is fixed on the sliding component, the first Hall element and the second Hall element are fixed on the body; when the sliding component slides from the first position to the second position, the magnetic field generating element is far away from the first Hall element and close to the second Hall element; and the method comprises:

obtaining a first detection signal value sent by the first Hall element and a second detection signal value sent by the second Hall element, corresponding to one or more first calibration positions reached during a sliding process of the sliding component;

comparing the first detection signal value corresponding to each of the one or more first calibration positions with a preset first reference signal value, and comparing the second detection signal value corresponding to each of the one or more first calibration positions with a preset second reference signal value; and calibrating the first reference signal value based on the first detection signal value, and calibrating the second reference signal value based on the second detection signal value, in response that a number of times that comparison results belong to a preset abnormal range reaches a preset threshold.

2. The method as claimed in claim 1, in response that the number of times that the comparison results belong to the preset abnormal range reaches the preset threshold, further comprising:

controlling the sliding component to slide to one or more preset second calibration positions that have not been reached before, and obtaining a third detection signal value sent by the first Hall element corresponding to each of the one or more second calibration positions and a fourth detection signal value sent by the second Hall element corresponding to each of the one or more second calibration positions; and calibrating a third reference signal value of the second calibration position based on the third detection signal value, and calibrating a fourth reference signal value of the second calibration position based on the fourth detection signal value.

3. The method as claimed in claim 1, wherein the one or more first calibration positions comprise one or more of a sliding-out deceleration position, a sliding-out accelerating position, a sliding-out interruption position, a sliding-in deceleration position, a sliding-in accelerating position, and a sliding-in interruption position, of the sliding component.

4. The method as claimed in claim 2, wherein controlling the sliding component to slide to the one or more preset second calibration positions that have not been reached before, and obtaining the third detection signal value sent by the first Hall element corresponding to each of the one or more second calibration positions and the fourth detection signal value sent by the second Hall element corresponding to each of the one or more second calibration positions, comprises:

sending a calibration notification in a pop-up window; and controlling the driving component to drive the sliding component to slide back and forth between the first position and the second position with a highest driving force after obtaining a confirmed calibration instruction, and obtaining the third detection signal value and the fourth detection signal value detected by the first Hall element and the second Hall element when the sliding component slides to the corresponding second calibration position.

5. The method as claimed in claim 4, wherein the calibration notification comprises a confirmation control, and the confirmed calibration instruction is obtained after a trigger operation on the confirmation control is received.

6. The method as claimed in claim 4, wherein the calibration notification comprises information on causes of detected obstacles.

7. The method as claimed in claim 2, further comprising:
counting third calibration positions corresponding to first detection signal values and second detection signal values; and
matching the third calibration positions with the first calibration positions, and determining second calibration positions that do not match the third calibration positions in the first calibration positions.

8. An electronic device, wherein the electronic device comprises a body, a sliding component, a detecting component and a driving component; the driving component is configured to control the sliding component to slide between a first position received in the body and a second position exposed from the body; the detecting component comprises a magnetic field generating element, a first Hall element and a second Hall element; the magnetic field generating element is fixed on the sliding component, the first Hall element and the second Hall element are fixed on the body; when the sliding component slides from the first position to the second position, the magnetic field generating element is far away from the first Hall element and close to the second Hall element; and the electronic device further comprises:
a memory,
a processor electrically coupled to the sliding component, and
a computer program stored on the memory and for running on the processor, and
in which the processor is configured to, when executing the computer program:
obtain a first detection signal value sent by the first Hall element and a second detection signal value sent by the second Hall element, corresponding to one or more first calibration positions reached during a sliding process of the sliding component;
compare the first detection signal value corresponding to each of the one or more first calibration positions with a preset first reference signal value, and compare the second detection signal value corresponding to each of the one or more first calibration positions with a preset second reference signal value; and
calibrate the first reference signal value based on the first detection signal value, and calibrate the second reference signal value based on the second detection signal value, in response that a number of times that comparison results belong to a preset abnormal range reaches a preset threshold.

9. The electronic device as claimed in claim 8, wherein the processor is further configured to:
in response that the number of times that the comparison results belong to the preset abnormal range reaches the preset threshold, control the sliding component to slide to one or more preset second calibration positions that have not been reached before,
obtain a third detection signal value sent by the first Hall element corresponding to each of the one or more second calibration positions and a fourth detection signal value sent by the second Hall element corresponding to each of the one or more second calibration positions; and
calibrate a third reference signal value of the second calibration position based on the third detection signal value, and calibrate a fourth reference signal value of the second calibration position based on the fourth detection signal value.

10. The electronic device as claimed in claim 8, wherein the one or more first calibration positions comprise one or more of a sliding-out deceleration position, a sliding-out accelerating position, a sliding-out interruption position, a sliding-in deceleration position, a sliding-in accelerating position, and a sliding-in interruption position, of the sliding component.

11. The electronic device as claimed in claim 9, wherein the processor is further configured to:
send a calibration notification in a pop-up window; and
control the driving component to drive the sliding component to slide back and forth between the first position and the second position with a highest driving force after obtaining a confirmed calibration instruction, and obtain the third detection signal value and the fourth detection signal value detected by the first Hall element and the second Hall element when the sliding component slides to the corresponding second calibration position.

12. The electronic device as claimed in claim 11, wherein the calibration notification comprises a confirmation control, and the confirmed calibration instruction is obtained after a trigger operation on the confirmation control is received.

13. The electronic device as claimed in claim 11, wherein the calibration notification comprises information on causes of detected obstacles.

14. The electronic device as claimed in claim 9, wherein the processor is further configured to:
count third calibration positions corresponding to first detection signal values and second detection signal values; and
match the third calibration positions with the first calibration positions, and determine second calibration positions that do not match the third calibration positions in the first calibration positions.

15. A non-transitory computer-readable storage medium with a computer program stored thereon, wherein when the computer program is executed by a processor of an electronic device, a method for calibrating a sliding of a sliding component is performed,
in which the sliding component is configured in the electronic device; the electronic device comprises a body, a detecting component and a driving component; the driving component is configured to control the sliding component to slide between a first position received in the body and a second position exposed from the body; the detecting component comprises a magnetic field generating element, a first Hall element and a second Hall element; the magnetic field generating element is fixed on the sliding component, the first Hall element and the second Hall element are fixed on the body; when the sliding component slides from the first position to the second position, the magnetic field generating element is far away from the first Hall element and close to the second Hall element; and the method comprises:
obtaining a first detection signal value sent by the first Hall element and a second detection signal value sent by the second Hall element, corresponding to one or more first calibration positions reached during a sliding process of the sliding component;
comparing the first detection signal value corresponding to each of the one or more first calibration positions with a preset first reference signal value, and comparing the second detection signal value corresponding to each of the one or more first calibration positions with a preset second reference signal value; and calibrating the first reference signal value based on the first detection signal value, and calibrating the second reference signal value based on the second detection signal value, in response that a number of times that comparison results belong to a preset abnormal range reaches a preset threshold.

16. The non-transitory computer-readable storage medium as claimed in claim 15, wherein the method further comprises:
   in response that the number of times that the comparison results belong to the preset abnormal range reaches the preset threshold, controlling the sliding component to slide to one or more preset second calibration positions that have not been reached before, and obtaining a third detection signal value sent by the first Hall element corresponding to each of the one or more second calibration positions and a fourth detection signal value sent by the second Hall element corresponding to each of the one or more second calibration positions; and
   calibrating a third reference signal value of the second calibration position based on the third detection signal value, and calibrating a fourth reference signal value of the second calibration position based on the fourth detection signal value.

17. The non-transitory computer-readable storage medium as claimed in claim 15, wherein the one or more first calibration positions comprise one or more of a sliding-out deceleration position, a sliding-out accelerating position, a sliding-out interruption position, a sliding-in deceleration position, a sliding-in accelerating position, and a sliding-in interruption position, of the sliding component.

18. The non-transitory computer-readable storage medium as claimed in claim 16, wherein controlling the sliding component to slide to the one or more preset second calibration positions that have not been reached before, and obtaining the third detection signal value sent by the first Hall element corresponding to each of the one or more second calibration positions and the fourth detection signal value sent by the second Hall element corresponding to each of the one or more second calibration positions, comprises:
   sending a calibration notification in a pop-up window; and
   controlling the driving component to drive the sliding component to slide back and forth between the first position and the second position with a highest driving force after obtaining a confirmed calibration instruction, and obtaining the third detection signal value and the fourth detection signal value detected by the first Hall element and the second Hall element when the sliding component slides to the corresponding second calibration position.

19. The non-transitory computer-readable storage medium as claimed in claim 18, wherein the calibration notification comprises a confirmation control, and the confirmed calibration instruction is obtained after a trigger operation on the confirmation control is received,
   or
   wherein the calibration notification comprises information on causes of detected obstacles.

20. The non-transitory computer-readable storage medium as claimed in claim 16, wherein the method further comprises:
   counting third calibration positions corresponding to first detection signal values and second detection signal values; and
   matching the third calibration positions with the first calibration positions, and determining second calibration positions that do not match the third calibration positions in the first calibration positions.

* * * * *